United States Patent
Sterzbach (10) Patent No.: US 10,109,111 B2
(45) Date of Patent: Oct. 23, 2018

(54) PROVIDING MOUNTING INFORMATION FOR ASSEMBLY OF CONNECTABLE COMPONENTS

(71) Applicant: Rohde & Schwarz GmbH & Co. KG, München (DE)

(72) Inventor: Bernhard Sterzbach, München (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/051,291

(22) Filed: Feb. 23, 2016

(65) Prior Publication Data

US 2017/0132840 A1     May 11, 2017

(30) Foreign Application Priority Data

Nov. 5, 2015   (EP) .................................. 15193133

(51) Int. Cl.
| | | |
|---|---|---|
| G06T 19/00 | (2011.01) | |
| H04N 7/18 | (2006.01) | |
| H04N 13/02 | (2006.01) | |
| H04N 13/204 | (2018.01) | |

(Continued)

(52) U.S. Cl.
CPC ...... *G06T 19/006* (2013.01); *G05B 19/41805* (2013.01); *G05B 19/41885* (2013.01); *G06F 3/011* (2013.01); *H04N 7/183* (2013.01); *H04N 13/0203* (2013.01); *H04N 13/204* (2018.05); *G05B 2219/31027* (2013.01);

(Continued)

(58) Field of Classification Search
USPC ........................................................ 345/633
See application file for complete search history.

(56) References Cited

U.S. PATENT DOCUMENTS

2008/0154551 A1\*   6/2008   Rodriguez ............ G06F 17/509
                                                          703/1
2010/0168891 A1\*   7/2010   Kretsis .................... G01S 5/163
                                                          700/98

(Continued)

FOREIGN PATENT DOCUMENTS

| | | |
|---|---|---|
| EP | 2 405 402 A1 | 1/2012 |
| WO | WO 2015/006334 A1 | 1/2015 |

OTHER PUBLICATIONS

Molineros, "Computer Vision and Augmented Reality for Guiding Assembly," Pennsylvania State University, Graduate School, Department of Computer Science and Engineering, p. 1-125 (May 2002).

(Continued)

*Primary Examiner* — Barry Drennan
*Assistant Examiner* — Terrell Robinson
(74) *Attorney, Agent, or Firm* — Shumaker & Sieffert, P.A.

(57) ABSTRACT

Embodiments of the present invention provide an information system for providing mounting information for a number of connectable devices and electrical devices to a user, comprising a camera configured to record a scene, a display, and a processing device coupled to the camera and the display and configured to display the scene in the display, and to identify in the scene a number of at least one of connectable devices or receptacles, and to overlay the scene in the display with mounting information for the identified connectable devices or the identified receptacles.

14 Claims, 4 Drawing Sheets

(51) Int. Cl.
*G05B 19/418* (2006.01)
*G06F 3/01* (2006.01)
(52) U.S. Cl.
CPC .............. *G05B 2219/32014* (2013.01); *G05B 2219/36371* (2013.01); *Y02P 90/04* (2015.11)

(56) References Cited

U.S. PATENT DOCUMENTS

| 2011/0115816 | A1* | 5/2011 | Brackney | G06Q 10/06 345/629 |
| 2012/0007852 | A1* | 1/2012 | Morate | G06T 19/006 345/419 |
| 2012/0069051 | A1* | 3/2012 | Hagbi | G06T 19/006 345/633 |
| 2013/0278635 | A1 | 10/2013 | Maggiore | |
| 2016/0284079 | A1* | 9/2016 | Persely | G06T 19/006 |
| 2017/0076500 | A1* | 3/2017 | Maggiore | G06T 19/006 |

OTHER PUBLICATIONS

Pathomaree et al., "Augmented reality for skill transfer in assembly task," IEEE International Workshop on Robots and Human Interactive Communication, p. 500-504 (Aug. 13, 2005).
European Search Report for Application No. 151193133 (dated May 20, 2015).
Response to Communication pursuant to Rule 69 EPC dated May 15, 2017, from counterpart European Patent Application No. 15193133.4, filed on Oct. 2, 2017, 30 pp.

* cited by examiner

PROVIDING MOUNTING INFORMATION FOR ASSEMBLY OF CONNECTABLE COMPONENTS

TECHNICAL FIELD

The invention relates to an information system and a method for providing mounting information for a number of connectable devices and electrical devices to a user.

BACKGROUND

The present invention is applicable to any system that uses cable connections between different electrical devices, like network equipment, e.g. for mobile phone testing, patch bays for data networks, and audio/video cabling in television studios or on stages for connecting music instruments and effect devices or the like. Nevertheless, the present invention will mainly be described in combination with measurement devices like, e.g. oscilloscopes and network testers.

There are a variety of applications where complex test installations have to be built up e.g. by a service technician. On example of such an application is the development and commissioning of mobile network equipment, e.g. for mobile phone networks. In such installations a multitude of cables have to be connected between the mobile network equipment and a plurality of measurement and analysis devices. Furthermore, in an already installed system it can be useful to identify all installed cables and the respective cable characteristics.

SUMMARY

Accordingly, there is a need for supporting the complex installation of a plurality of cables between electrical devices.

Therefore, an information system for providing mounting information for a number of connectable devices and electrical devices to a user comprises a camera configured to record a scene, a display, and a processing device coupled to the camera and the display and configured to display the scene in the display, and to identify in the scene a number of connectable devices and/or receptacles, and to overlay the scene in the display with mounting information for the identified connectable devices and/or the identified receptacles.

Furthermore, a method for providing mounting information for a number of connectable devices and electrical devices to a user comprises recording a scene with a camera, identifying in the scene a number of connectable devices and/or receptacles, overlaying the scene with mounting information for the identified connectable devices and/or the identified receptacles, and displaying the scene with the overlay information in a display.

The information system provides the user with an augmented display of the scene recorded with the camera. The term camera in this regard refers to every device capable of recording an image of a scene. The camera can e.g. be a CMOS-Camera, a 3D-Camera or the like. The scene is augmented with specific mounting information about connectable devices, like e.g. cables or calibration standards, or receptacles identified in the scene. The specific mounting information can e.g. comprise information about the direction in which the receptacle for a connectable device is located. If a receptacle and a connectable device are located in the scene the processing device can also display information about whether the connectable device should be plugged into the visible receptacle or into another receptacle. If more than one receptacle is identified in the scene the processing device can also display mounting information about the correct receptacle into which the connectable device should be plugged in.

The information system therefore provides a user with detailed instructions about mounting of the respective connectable devices. The user doesn't need to study any instructions or detailed cabling plans to be able to e.g. connect a plurality of cables between two electrical devices, like e.g. measurement devices.

Further embodiments of the present invention are subject of the further subclaims and of the following description, referring to the drawings.

In a possible embodiment the processing device can be configured to identify the electrical devices and/or connectable devices and/or receptacles by identifying an optical code on the connectable devices and/or receptacles. Furthermore, the information system can comprise a database configured to store for every optical code the mounting information of the respective connectable device and/or receptacle. The optical code can e.g. be a bar code, a QR-code or any other code which can be decoded by the processing device. Using an optical code allows easily identifying the single connectable devices and receptacles and differentiating connectable devices and receptacles even within a large number of connectable devices and receptacles. For example on a connectable device end, e.g. a cable end, a one dimensional barcode can be used, which is wound around the cable end, and can thus be viewed from all directions. The optical code can comprise not only an identification number for the respective electrical devices and/or connectable devices and/or receptacles. Instead the optical code can also comprise for the electrical devices and/or connectable devices and/or receptacles the type, the serial number, a relative position information e.g. for a receptacle in relation to a housing of the electrical device, or the like. All this information can be stored for later use by the processing device in the database. As an alternative or in addition the processing device can access a central database and retrieve the mounting information and the information listed above corresponding to the respective electrical devices, connectable devices and receptacles based on an ID of the respective electrical devices, connectable devices and receptacles.

In a possible further embodiment the information system can comprise a position sensor configured to identify the position and orientation of the camera in three dimensional space, wherein the processing device can be configured to determine the position of the electrical devices and/or the identified connectable devices and/or the identified receptacles. Furthermore the processing device can be configured to display the mounting information at the position of the respective identified connectable devices and/or the respective identified receptacles on the display. The position sensor can be a relative or an absolute position sensor. That means that the information system is capable of tracking the camera position and orientation and of calculating the positions of connectable devices and receptacles with respect to the camera. This allows not only displaying the mounting information in the display at the position of the respective connectable devices and/or receptacles. It also allows moving the displayed information if the camera is moved, such that the information is always displayed near the respective connectable devices and/or receptacles.

In one embodiment the position sensor is embodied as virtual relative position sensor which based on the recorded camera images calculates the position of the camera relative to the electrical devices, connectable devices and receptacles. This type of sensor can e.g. use image or pattern analysis algorithms to detect the electrical devices, connectable devices and receptacles and their relative positions as well as the camera position. The position sensor can e.g. analyse the images recorded by the camera and generate a 3D representation of the scenes using consecutively recorded images. Furthermore, the position sensor can analyse which electrical devices, connectable devices and receptacles are visible in a scene and based on their geometrically distorted appearances in the image and on their known shapes and dimensions, draw a conclusion about their positions and the camera position.

In a further possible embodiment the processing device can be configured to indicate with the mounting information of a connectable device the direction in which the respective receptacle is located, if the respective receptacle for the connectable device was already identified. In addition or as an alternative the processing device can be configured to indicate with the mounting information of a receptacle the direction in which the respective connectable device is located if the respective connectable device for the receptacle was already identified. This allows indicating to a user where a connectable device has to be mounted, even if the respective receptacle is at the moment not visible in the display. While the camera moves, the processing device can keep track of the movement and overlay respective mounting information over a scene, if the respective receptacle comes into view. This means that a user can first look with the camera at a connectable device and the processing device will identify the connectable device. The user can then look around with the camera in the direction indicated by the mounting information displayed with the connectable device. As soon as the respective receptacle comes into view the user will be alerted by further respective mounting information.

In a further possible embodiment the processing device can be configured to calculate for all identified electrical devices and/or the identified connectable devices and/or the identified receptacles the distance between the respective receptacles which have to be connected by a connectable device and verify if the connectable device which is provided to connect the respective receptacles is at least as long as the calculated distance. By identifying the positions of all identified electrical devices, connectable devices, and receptacles it becomes possible to check in advance if e.g. the cable provided for connecting e.g. two different electrical devices are long enough. This information can be provided to the user such that the user can move the electrical devices or supply longer cables if necessary.

In a further possible embodiment the processing device can be configured to mark a connectable device and/or a receptacle which is positioned by the user in the middle of the camera view as active connectable device and/or receptacle, and the processing device can be configured to display mounting information only for the active connectable device and/or receptacle. By reducing the amount of displayed mounting information, the complexity of the displayed image is greatly reduced and the computations needed to place the mounting information are reduced. Furthermore, the understanding of the mounting information for a user is enhanced by the simplification and by the focusing on a single connectable device or receptacle. In one embodiment the connectable device and/or a receptacle which is positioned by the user in the middle of the camera view is only temporarily marked as active until the user confirms the selection. Only after the user confirms the selection is the connectable device and/or a receptacle definitely marked as active.

In a further possible embodiment the processing device can be configured to subsequently store information about all connected connectable devices and/or receptacles which have been mounted using the information system. Furthermore, the processing device can be configured to display in the display a list of connectable devices which are not yet connected. The processing device can e.g. derive from the information about the type of electrical devices which should be connected the number and type of connectable devices needed. The connectable devices which are installed are marked as mounted. The user can at any moment request a list of the connectable devices not yet mounted and the processing device can generate such a list from the information about the type of electrical devices and the information about the connectable devices which are marked as mounted. This not only facilitates to the user the mounting of the connectable devices but also allows automatically assessing whether the electrical devices are connected to each other correctly.

In a further possible embodiment the information system can comprise a communication interface which is coupled to the processing device. Furthermore, the processing device can be configured to transmit via the communication interface information about the connectable devices which already are connected to one of the electrical devices to said electrical device. The information which is transmitted to the electrical device can e.g. comprise the type of connectable device, information about the high frequency properties, like e.g. damping characteristics, of the connectable device or the like. This information can then be used by the electrical device, e.g. a measurement equipment, to adapt the input circuits or the digital data acquisition and manipulation accordingly.

In a further possible embodiment the information system can comprise a diagnosis unit configured to inspect if all connectable devices have been connected to the correct receptacles. Furthermore, the processing device can be configured to indicate in the display movement directions in which the camera has to be moved by the user in order for the processing device to generate a list with all electrical devices and/or connectable devices and/or receptacles into which connectable devices have been mounted after the connectable devices have been mounted, wherein the diagnosis unit can be configured to inspect if all connectable devices have been connected to the correct receptacles based on said list. After the user completes the mounting procedure the processing unit can start a diagnosis session and indicate to the user all viewing positions necessary to detect all connectable devices and receptacles. The processing unit can e.g. derive from the distance between the optical code of a connectable device and the optical code of a receptacle if the connectable device is connected to the receptacle. The list with the connected connectable devices can then automatically be parsed by the diagnosis unit and erroneous connections can be identified. For documentation purposes the processing unit can also automatically store a picture of the respective connectable devices, the receptacles or the connections between the connectable devices and the receptacles.

In a further possible embodiment the information system can be coupled with the electrical devices and receive measurement values from the respective electrical devices. The measurement values can e.g. be measurement values taken at specific receptacles of the electrical devices after a connectable device has been connected to the receptacle. This allows the information system to analyse e.g. a cable connected to a receptacle and identify defective cables, which can then be marked in the display and easily be exchanged by a user.

In a further possible embodiment the information system can be coupled with the electrical devices and receive information about connectable devices which are being in use at the moment of the information transmission. This information can be displayed together with the respective connectable device when it is in view of the camera. This allows the user e.g. to identify unused cables which can be disconnected or exchanged. Furthermore, status information about the electrical devices can be transmitted to the information system, which can also be displayed to a user.

In a further possible embodiment a number, i.e. one or more, of information systems according to the present invention can be combined and configured to exchange mounting data. This allows e.g. to coordinate different users which work on the same construction but in remote locations.

In a further possible embodiment camera images, with or without overlay information, and further mounting information or data of the information system can be forwarded e.g. to a user or a central service station, where the working on the electrical devices, connectable devices and receptacles can be supervised and supported.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

The enclosed drawings are intended to provide further understanding of the embodiments of the invention. They illustrate embodiments and, in conjunction with the description, serve to explain principles and concepts of the invention. Other embodiments and many of the stated advantages can be found from the drawings. The elements of the drawings are not necessarily shown in scale with one another.

In the figures of the drawing, any elements and components that are identical, have the same function and work in the same way, are each given the same reference signs, unless stated otherwise.

DETAILED DESCRIPTION OF THE DRAWINGS

Figure 1:
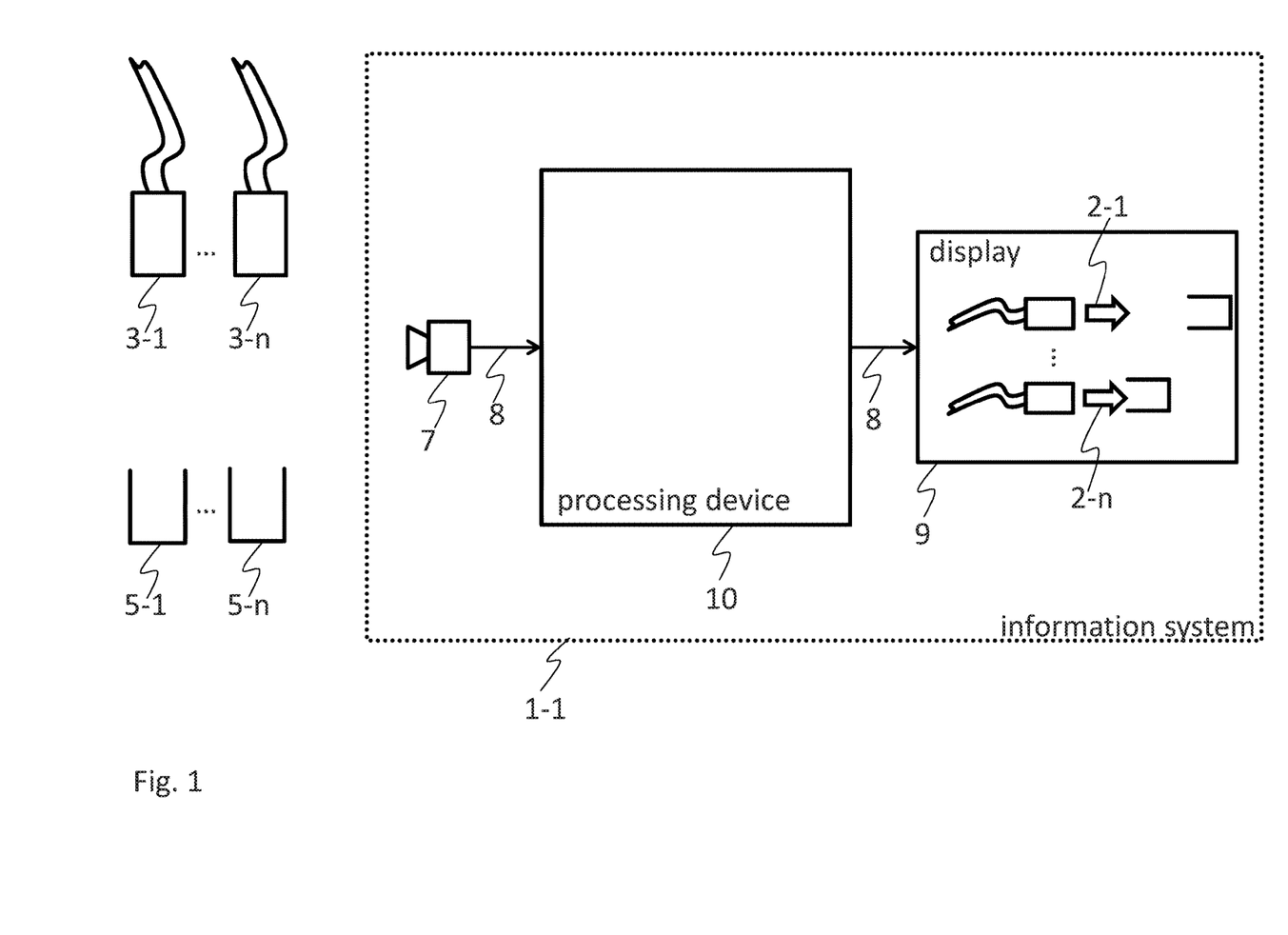
FIG. 1 shows a block diagram of an embodiment of an information system according to an embodiment of the present invention.

FIG. 1 shows a block diagram of an embodiment of an information system 1-1 with a camera 7, a processing device 10 and a display 9.

The camera 7 is configured to record a scene 8 and transmit the data regarding the recorded scene 8 to the processing device 10. The processing device 10 in turn is configured to enhance the recorded scene 8 with additional mounting information 2-1-2-$n$ and display the enhanced scene 8 in the display 9.

In front of the camera 7 there are shown two connectable devices embodied as cable connectors 3-1 and 3-$n$.

Furthermore, together with the cable connectors 3-1 and 3-$n$ respective receptacles 5-1 and 5-$n$ are shown. Possible further connectable devices and receptacles are hinted at by three dots. The connectors 3-1 and 3-$n$ and the receptacles 5-1 and 5-$n$ represent a stylised version of a real scene which could be recorded by the camera 7 in a real application situation.

In order to enhance the scene 8 for displaying to a user, the processing device 10 identifies in the scene 8 the connectors 3-1 and 3-$n$ and the corresponding receptacles 5-1 and 5-$n$. The identification can be based on optical pattern or image recognition techniques, RFID, or the like. After identifying the single connectors 3-1 and 3-$n$ and receptacles 5-1 and 5-$n$ the processing device 10 includes the respective mounting information 2-1 and 2-$n$ as overlay in the scene 8 and displays in the display 9 the scene 8 together with the mounting information 2-1 and 2-$n$.

The processing device 10, the camera 7 and the display 9, as well as further elements shown in combination with other embodiments of the information system 1-1, can be included in a single device, like a smartphone, a PDA, a tablet PC or the like. In another embodiment the elements of the information system 1-1 can be distributed over a variety of devices. For example the camera 7 and the display 9 could be included in a head mounted system and the processing device 10 could be provided in a computer connected to the head mounted system.

Every other partitioning of the elements of the information system 1-1 is also covered by this patent application.

Providing mounting information 2-1-2-$n$ for all presently visible connectable devices 3-1-3-$n$ and/or receptacles 5-1-5-$n$ can clutter the display 9 with too much information to be comfortably used by the user for mounting the connectable devices 3-1-3-$n$ and/or receptacles 5-1-5-$n$. In order to simplify the mounting of the connectable devices 3-1-3-$n$ for the user, the processing device 10 can mark as active a connectable device 3-1-3-$n$ and/or a receptacle 5-1-5-$n$ which is positioned by the user in the middle of the camera view or the scene 8.

Until the active connectable device 3-1-3-$n$ and/or receptacle 5-1-5-$n$ is finally mounted by the user the processing device 10 displays mounting information 2-1-2-$n$ only for the active connectable device 3-1-3-$n$ and/or receptacle 5-1-5-$n$.

Furthermore, to supervise the overall progress of the mounting process the processing device 10 can subsequently store information about all connected connectable devices 3-1-3-$n$ and/or receptacles 5-1-5-$n$ which have been mounted using the information system 1-1. It is then possible to display, e.g. in the display 9 or the display of a related computer, a list of connectable devices 3-1-3-$n$ which are not yet connected. It is also possible to audibly or visually indicate to a user that all connectable devices 3-1-3-$n$ have been mounted.

Figure 2:
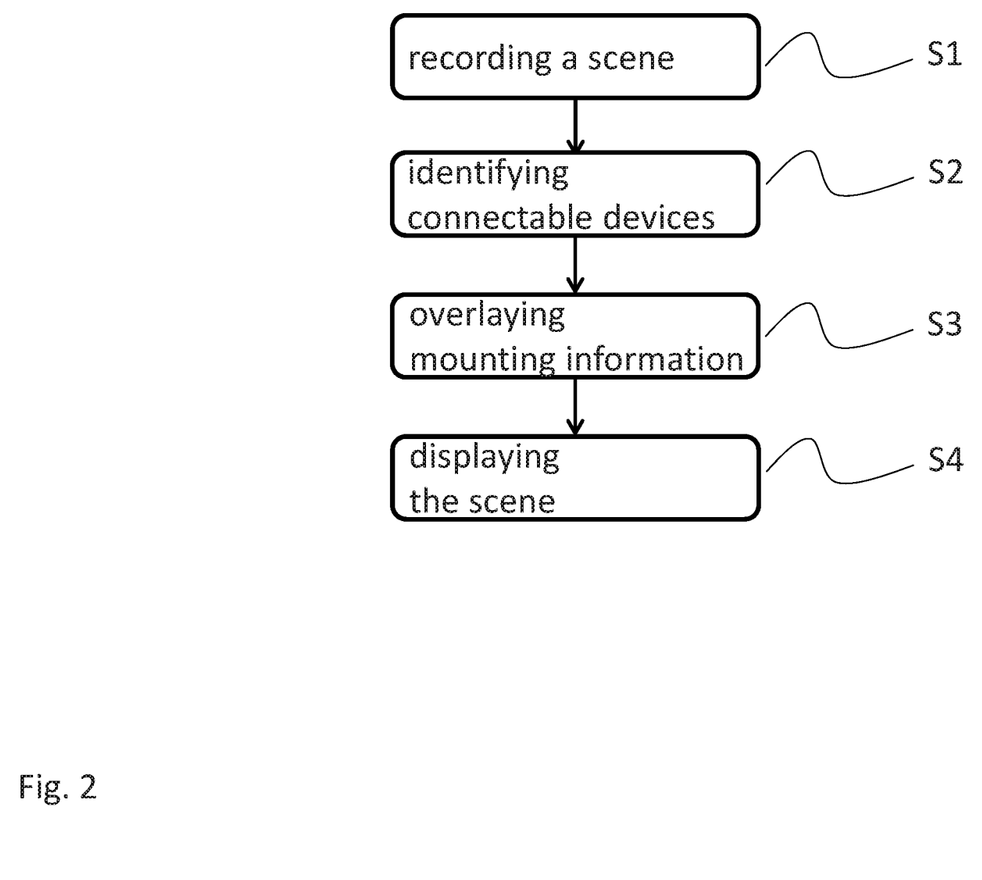
FIG. 2 shows a flow diagram of an embodiment of a method according to an embodiment of the present invention.

FIG. 2 shows a flow diagram of an embodiment of a method for providing mounting information 2-1-2-$n$ for a number of connectable devices 3-1-3-$n$ and electrical devices 4-1-4-$n$ to a user.

The method starts with recording S1 a scene 8 with the camera 7. In a second step a number of connectable devices 3-1-3-*n* and/or receptacles 5-1-5-*n* in the scene 8 are identified S2. Following the identification of connectable devices 3-1-3-*n* and/or receptacles 5-1-5-*n* the scene 8 is overlaid S3 with mounting information 2-1-2-*n* for the respective connectable devices 3-1-3-*n* and/or receptacles 5-1-5-*n*. Finally, the scene 8 is displayed S4 with the overlay information 2-1-2-*n* in a display 9 for a user to use the overlay information 2-1-2-*n* to mount the connectable devices 3-1-3-*n* in the correct receptacles 5-1-5-*n*.

Tracking the mounting process can be supported by storing information about all connected connectable devices 3-1-3-*n* and/or receptacles 5-1-5-*n* which have been mounted. This allows displaying a list of connectable devices 3-1-3-*n* which are not yet connected, and to notify a user when all connectable devices 3-1-3-*n* have been mounted.

Figure 3:
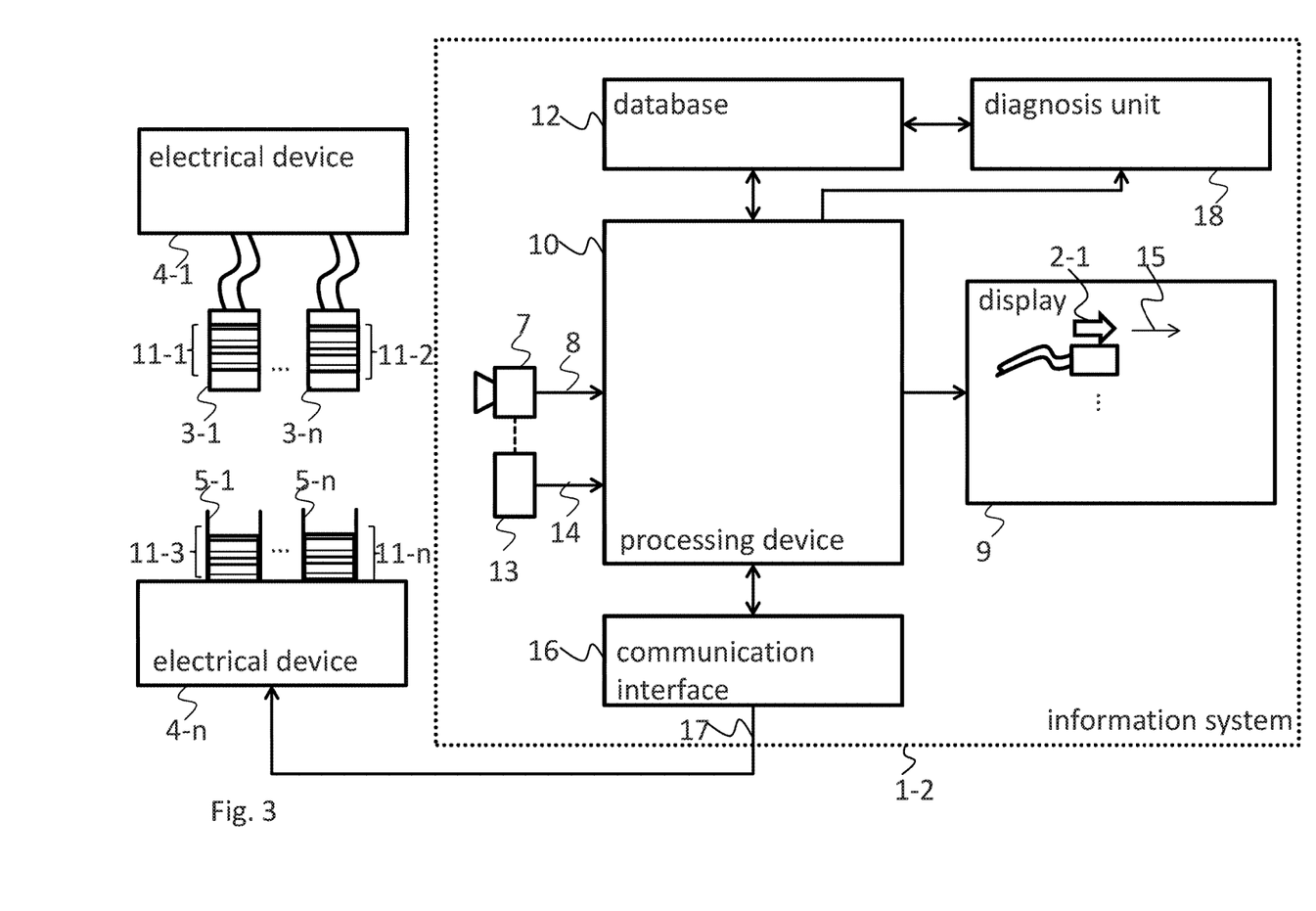
FIG. 3 shows a block diagram of another embodiment of an information system according to an embodiment of the present invention.

FIG. 3 shows a block diagram of another embodiment of an information system 1-2 according to the present invention which extends the information system 1-1 of FIG. 1 with further features.

The processing device 10 of the information system 1-2 is configured to identify the electrical devices 4-1-4-*n*, connectable devices 3-1-3-*n* and/or receptacles 5-1-5-*n* by identifying an optical code 11-1-11-*n* on the connectable devices 3-1-3-*n* and/or receptacles 5-1-5-*n*. In FIG. 3 the optical codes are barcodes 11-1-11-*n* which are circumferentially attached to the connectable devices 3-1-3-*n* and/or receptacles 5-1-5-*n*. Such a barcode arrangement can easily be detected and deciphered from any viewing angle and therefore allows an easy identification of the connectable devices 3-1-3-*n* and/or receptacles 5-1-5-*n*.

Furthermore, the information system 1-2 comprises in addition to the camera 7, the processing device 10 and the display 9 a database 12, a position sensor 13, a communication interface 17 and a diagnosis unit 18 which are all coupled to the processing device 10.

The database 12 is used to store for every optical code 11-1-11-*n* the mounting information 2-1-2-*n* of the respective connectable device 3-1-3-*n* and/or receptacle 5-1-5-*n*. The mounting information 2-1-2-2 can be pre-stored in the database 12 or can be dynamically loaded by the processing device 10 e.g. from a central database (not shown). Such a central database can e.g. be hosted on a server which is accessible over the internet.

After identifying the single connectable device 3-1-3-*n* and/or receptacle 5-1-5-*n* the processing device 10 can then display the mounting information 2-1-2-*n* at the position of the respective identified connectable devices 3-1-3-*n* and/or the respective identified receptacles 5-1-5-*n* on the display 9.

Furthermore, in the database 12 the processing device 10 can store the information about all connected connectable devices 3-1-3-*n* and/or receptacles 5-1-5-*n* which have been mounted using the information system 1-1 to track the mounting progress as already explained above.

The position sensor 13 can be used by the processing device to identify the position and/or orientation 14 of the camera 7 in three dimensional space. This information can be used by the processing device 10 to determine the position of the electrical devices 4-1-4-*n*, the identified connectable devices 3-1-3-*n* and/or the identified receptacles 5-1-5-*n*. The processing device 10 can e.g. use a method like dead reckoning to calculate and follow the position of the camera 7. Based on a known camera position the processing device can then also calculate the positions of the electrical devices 4-1-4-*n*, the identified connectable devices 3-1-3-*n* and/or the identified receptacles 5-1-5-*n*.

Knowing the exact location of connectable devices 3-1-3-*n* and of the respective receptacle 5-1-5-*n* the processing device 10 can indicate with the mounting information 2-1-2-*n* of a connectable device 3-1-3-*n* the direction 15 in which the respective receptacle 5-1-5-*n* is located or vice versa. This is especially useful if either the receptacle 5-1-5-*n* for a visible connectable device 3-1-3-*n* or the connectable device 3-1-3-*n* for a visible receptacle 5-1-5-*n* is not visible in the scene 8.

Furthermore, knowing the location of connectable devices 3-1-3-*n* and the receptacles 5-1-5-*n* the processing device 10 calculates for all identified electrical devices 4-1-4-*n*, connectable devices 3-1-3-*n* and/or receptacles 5-1-5-*n* the distance between the respective receptacles 5-1-5-*n* which have to be connected by a connectable device 3-1-3-*n*, like a cable, and verify if the cable 3-1-3-*n* which is provided to connect the respective receptacles 5-1-5-*n* is at least as long as the calculated distance.

In FIG. 3 the communication interface 16 couples the processing device 10 with the electrical device 4-*n*. Via this connection the processing device 10 transmits information 17 about the connectable devices 3-1-3-*n* to the electrical device 4-*n*. Such information can e.g. comprise information about the used cables like resistances, RF characteristics and the like. This allows the electrical device 4-*n* to verify if e.g. the correct cables have been connected to the electrical device 4-*n*. Furthermore, if the electrical device 4-*n* has the capability to adapt its interfaces to different cables the electrical device 4-*n* can use the information 17 to adapt its interfaces correspondingly.

Finally the information system 1-2 comprises a diagnosis unit 18 which inspects if all connectable devices 3-1-3-*n* have been connected to the correct receptacles 5-1-5-*n*.

Figure 4:
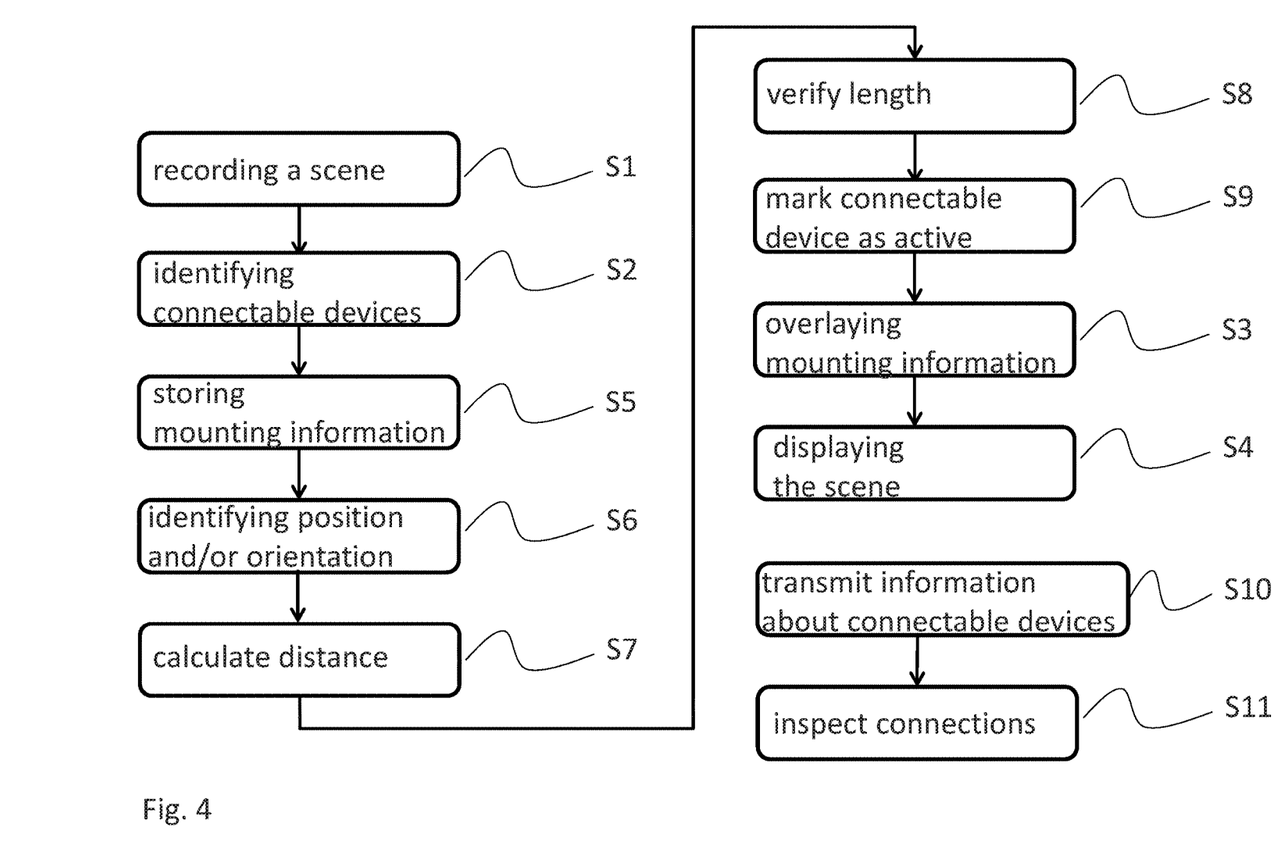
FIG. 4 shows a flow diagram of another embodiment of a method according to an embodiment of the present invention.

FIG. 4 shows a flow diagram of another embodiment of a method according to the present invention. The method of FIG. 4 is based on the method of FIG. 2 and comprises method steps S5-S9 between method steps S2 and S3, and comprises method steps S10 and S11 after method step S4.

In order to simplify the identification step S2, the step of identifying S2 comprises identifying the electrical devices 4-1-4-*n*, connectable devices 3-1-3-*n* and/or receptacles 5-1-5-*n* by identifying an optical code 11-1-11-*n* on the connectable devices 3-1-3-*n* and/or receptacles 5-1-5-*n*. After the identification step S2 the method further comprises storing S5 for every optical code 11-1-11-*n* the mounting information 2-1-2-*n* of the respective connectable device 3-1-3-*n* and/or receptacle 5-1-5-*n* for further use.

To improve the mounting information 2-1-2-*n* with extra directional indications in step S6 the position and/or orientation 14 of the camera 7 in three dimensional space is determined. Furthermore, the position of the electrical devices 4-1-4-*n*, the identified connectable devices 3-1-3-*n* and/or the identified receptacles 5-1-5-*n* is extracted from the images recorded by the camera 7 together with the known camera position. If the positions of electrical devices 4-1-4-*n*, the identified connectable devices 3-1-3-*n* and/or the identified receptacles 5-1-5-*n* are known, with the mounting information 2-1-2-*n* of a connectable device 3-1-3-*n* the direction 15 in which the respective receptacle 5-1-5-*n* or connectable device 3-1-3-*n* is located can be displayed to help the user find the respective receptacle 5-1-5-*n* or connectable device 3-1-3-*n*.

In step S7 for all identified electrical devices 4-1-4-*n*, identified connectable devices 3-1-3-*n* and/or identified receptacles 5-1-5-*n* the distance between the respective receptacles 5-1-5-*n* which have to be connected by a connectable device 3-1-3-*n*, i.e. a cable, is calculated. The information about the single connectable devices 3-1-3-*n* deduced from the optical code 11-1-11-*n* can e.g. comprise the length of the respective cable. Based on the calculated distance and the known length it is verified in step S8 if the cable 3-1-3-*n* which is provided to connect the respective receptacles 5-1-5-*n* is at least as long as the calculated distance. If not, this fact can be displayed to the user, who can then select another cable.

To facilitate handling of the connectable devices 3-1-3-*n* a connectable device 3-1-3-*n* or a receptacle 5-1-5-*n* which is positioned by the user in the middle of the camera view and/or scene 8 is marked in step S9 as active connectable device 3-1-3-*n* or receptacle 5-1-5-*n*. From this moment on mounting information 2-1-2-*n* is displayed only for the active connectable device 3-1-3-*n* or receptacle 5-1-5-*n* until it is connected or another connectable device 3-1-3-*n* or another receptacle 5-1-5-*n* is selected as active.

Finally in step S11 it is inspected if all connectable devices 3-1-3-*n* have been connected to the correct receptacles 5-1-5-*n*. To facilitate this step in the display movement directions can be indicated in which the camera 7 has to be moved by the user in order to generate a list with all electrical devices 4-1-4-*n*, connectable devices 3-1-3-*n* and/or receptacles 5-1-5-*n* into which connectable devices 3-1-3-*n* have already been mounted. Based on the acquired information it is then inspected if all connectable devices 3-1-3-*n* have been connected to the correct receptacles 5-1-5-*n*.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. An information system for providing mounting information for a number of connectable devices and electrical devices to a user, comprising:
a camera configured to record a scene,
a display,
a processing device coupled to the camera and the display and configured to display the scene in the display, and to identify in the scene a number of connectable devices or receptacles, and to overlay the scene in the display with mounting information for the identified connectable devices and receptacles, and
a position sensor configured to identify at least one of the position or orientation of the camera in three dimensional space, and
a communication interface which is coupled to the processing device, wherein the processing device is configured to transmit, via the communication interface and to a selected electrical device of the electrical devices, information about the connectable devices connected to the selected electrical device,
wherein the processing device is configured to determine the position of the electrical devices or the identified connectable devices or the identified receptacles,
wherein the processing device is configured to identify at least one of the electrical devices, the connectable devices or the receptacles by identifying an optical code on at least one of the electrical devices, the connectable devices or receptacles, wherein information associated with the optical code of the connectable device comprises at least a length of the connectable device,
wherein the processing device is configured to display the mounting information at the position of the respective identified connectable devices or receptacles on the display,
wherein the processing device is configured to calculate for all identified electrical devices and the identified connectable devices and the identified receptacles the distance between the respective receptacles which have to be connected by a connectable device and verify prior to mounting by the user if a first connectable device selected by the user is long enough to span a calculated distance between a first pair of electronic devices, based on the information associated with the optical code of the connectable device.

2. The information system according to claim 1,
wherein the information system comprises a database configured to store for every optical code the mounting information of the respective connectable device or receptacle.

3. The information system according claim 1, wherein the processing device is configured to indicate with the mounting information of a connectable device the direction in which the respective receptacle is located if the respective receptacle for the connectable device was already identified.

4. The information system according claim 1,
wherein the processing device is configured to indicate the mounting information of a receptacle and the direction in which the respective connectable device is located if the respective connectable device for the receptacle was already identified.

5. The information system according to claim 1,
wherein the processing device is configured to mark a connectable device or a receptacle which is positioned by the user in the middle of the camera view or scene as an active connectable device or receptacle, respectively, and
wherein the processing device is configured to display mounting information only for the active connectable device or receptacle.

6. The information system according to claim 1,
wherein the processing device is configured to subsequently store information about all connected connectable devices and receptacles which have been mounted using the information system, and
wherein the processing device is configured to display in the display a list of connectable devices which are not yet connected.

7. The information system according to claim 1,
comprising a diagnosis unit configured to inspect if all connectable devices have been connected to the correct receptacles,
wherein the processing device is configured to indicate in the display movement directions in which the camera has to be moved by the user in order for the processing device to generate a list with all electrical devices and connectable devices and receptacles into which connectable devices have been mounted after they have been mounted,
wherein the diagnosis unit is configured to inspect, based on said list, if all connectable devices have been connected to the correct receptacles.

8. A method for providing mounting information for a number of connectable devices and electrical devices to a user, comprising:
recording a scene with a camera,
identifying in the scene a number of electrical devices, connectable devices or receptacles,
wherein identifying comprises identifying the electrical devices or connectable devices or receptacles by identifying an optical code on the connectable devices or receptacles, wherein information associated with the optical code of the connectable device comprises at least a length of the connectable device,
overlaying the scene with mounting information for the identified connectable devices and the identified receptacles,
displaying the scene with the overlay information in a display,
identifying at least one of the position or orientation of the camera in three dimensional space,
and determining the position of the electrical devices or the identified connectable devices or the identified receptacles, and
wherein the mounting information is displayed at the position of the respective identified connectable devices or the respective identified receptacles on the display, and
wherein for all identified electrical devices or identified connectable devices or identified receptacles the distance between the respective receptacles which have to be connected by a connectable device is calculated and it is verified prior to mounting by the user if a first connectable device selected by the user is long enough to span a calculated distance between a first pair of electronic devices, based on the information associated with the optical code of the connectable device, and
wherein information about the connectable devices connected to one of the electrical devices is transmitted to the respective electrical device.

9. The method according to claim 8,
the method further comprising storing for every optical code the mounting information of the respective connectable device or receptacle.

10. The method according to claim 8,
wherein with the mounting information of a connectable device the direction in which the respective receptacle is located is indicated if the respective receptacle for the connectable device was already identified.

11. The method according to claim 8,
wherein with the mounting information of a receptacle the direction in which the respective connectable device is located is displayed if the respective connectable device for the receptacle was already identified.

12. The method according to claim 8,
wherein a connectable device or a receptacle which is positioned by the user in the middle of the camera view or scene is marked as an active connectable device or receptacle, and wherein mounting information is displayed only for the active connectable device or receptacle.

13. The method according to claim 8,
wherein information about all connected connectable devices or receptacles which have been mounted is subsequently stored, and wherein in the display a list of connectable devices which are not yet connected is displayed.

14. The method according to claim 8,
comprising inspecting if all connectable devices have been connected to the correct receptacles,
wherein in the display movement directions are indicated in which the camera has to be moved by the user in order to generate a list with all electrical devices or connectable devices or receptacles into which connectable devices have already been mounted, wherein it is inspected if all connectable devices have been connected to the correct receptacles based on said list.

* * * * *